Sept. 18, 1956 W. C. HILL 2,763,433
THERMOSTATIC VALVE
Filed Oct. 13, 1954

INVENTOR.
WILLIAM C. HILL
BY
ATTORNEYS

United States Patent Office 2,763,433
Patented Sept. 18, 1956

2,763,433

THERMOSTATIC VALVE

William C. Hill, Detroit, Mich., assignor to W. M. Chace Company, Detroit, Mich., a corporation of Michigan Application October 13, 1954, Serial No. 462,046

10 Claims. (Cl. 236—93)

This invention relates to a thermostatic valve.

The invention is specifically concerned with valves that are particularly useful for controlling the flow of exhaust gases through the exhaust line of an internal combustion engine. Thermostatic valves are used in such arrangements to direct the flow of hot exhaust gases from the exhaust manifold of the internal combustion engine through the hot box section of the intake manifold when the engine is cold and during the warming up period of operation. This assists in vaporizing the fuel charge. After the engine is warmed up, the valve is adapted to open and permit the exhaust of gases directly to the exhaust muffler. Since a valve of this type is more or less permanently mounted in the exhaust system of the engine, it is important that the valve have sufficient capacity to handle the hot exhaust gases and is capable of being subjected to relatively high temperatures without a change in the calibration of the valve. It is also important for the valve to withstand the pulsation effects created by the alternate firing of the engine cylinders.

The invention contemplates a valve which possesses the above attributes. The valve of this invention is an improvement over the valve disclosed in the patent to Alban and Hill No. 2,673,687.

Figure 1:
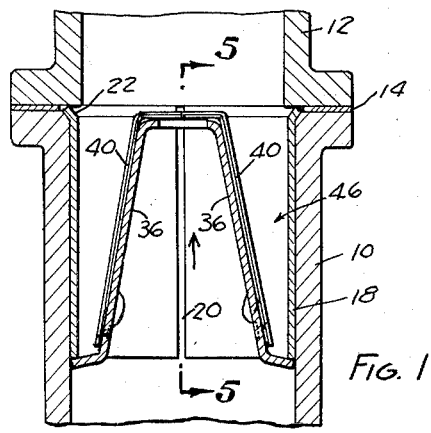
Fig. 1 is a sectional view of a portion of an exhaust system of an internal combustion engine showing the valve of this invention arranged therein.
Figure 2:
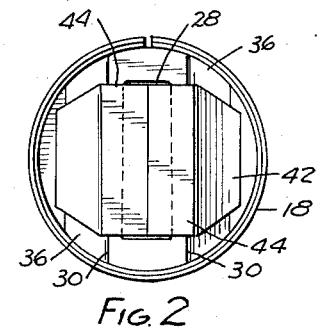
Fig. 2 is an end view of the valve of this invention as viewed from the downstream end.
Figure 7:
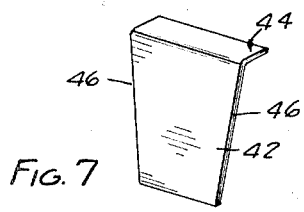
Fig. 7 is a perspective view of one of the bimetal elements employed in the valve.

In the drawings there is illustrated a conduit 10 which may, for example, lead from the exhaust manifold of an internal combustion engine not shown. A second conduit 12 is connected with a conduit 10 and may lead to an exhaust muffler. A gasket 14 is interposed between the adjacent ends of the conduits 10 and 12. The valve of this invention, generally indicated 16, is shown mounted within the end of conduit 10. In this arrangement, the hot exhaust gases from the engine would flow in the direction of the arrow in Fig. 1.

The valve to which the present invention is directed comprises a tube 18 which is preferably axially split as at 20. Tube 18 is dimensioned to be snugly received within the end of conduit 10. At one end, tube 18 may be slightly flared as at 22 to positively prevent axial movement of the tube 18 within conduit 10. The axial split 20 enables circumferential contraction of the tube so that it can be slipped into the end of conduit 10 and expand into frictional engagement with the inner surface of conduit 10.

Figure 6:
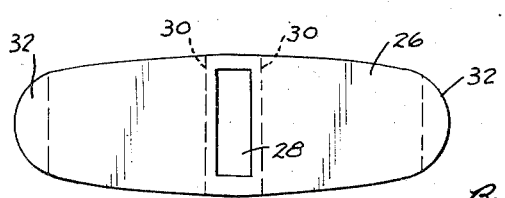
Fig. 6 is a plan view of the baffle portion of the valve preparatory to bending it into the shape which it assumes when mounted within the valve.

Within tube 18 there is arranged a baffle 24. Baffle 24 is in the nature of a shield originally formed as an oval blank 26 (Fig. 6). At the central portion thereof, the blank 26 is formed with an opening 28. In shaping blank 26 into baffle 24, the blank is bent along spaced apart lines 30 into U shape. The opposite end portions 32 are turned outwardly as shown so that the peripheral edge of the baffle has a rather close fit with the inner surface of tube 18. Baffle 24 is arranged in tube 18 so that the opening 28 provides a central orifice adjacent the flared end of the tube. It will be noted that baffle 24 cooperates with portions of the side wall of the tube to form a venturi passageway 34 in the exhaust line, the orifice 28 being located at the smaller end of the venturi throat. The size of orifice 28 is predetermined to accommodate the necessary flow of gases through conduit 10. It will be observed that the inclined walls 36 of baffle 24 are shaped to promote a smooth flow of the exhaust gases through the valve with a minimum of turbulence. Baffle 24 is fixedly mounted within tube 18 in any suitable manenr such as by tack welding edge portions of the baffle to the wall of tube 18 as at 38.

A pair of bimetal elements 40 are provided for controlling the closing and the opening of orifice 28 in response to the temperature of the exhaust gases flowing through conduit 10. Each element 40 is fashioned with a leg 42 and an end 44 which is bent into a plane generally perpendicular to the plane of leg 42. The side edges 46 of leg 42 converge slightly in a direction away from end 44. One bimetal element is positioned against the outer face of each inclined wall 36 of the baffle. The bimetal elements 40 are secured to the baffle 24 as by spot welding at 48. These bimetal elements when relatively cool assume the position shown in Fig. 1 wherein the legs 42 extend in co-planar fashion along the outer faces of walls 36 with the ends 44 thereof in opposed relation and overlying and closing orifice 28 substantially completely.

Figure 3:
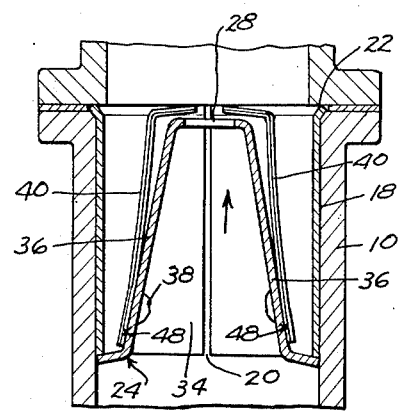
Fig. 3 is a view similar to Fig. 1 showing the valve partially opened and Fig. 4 shows the valve fully opened.
Figure 4:
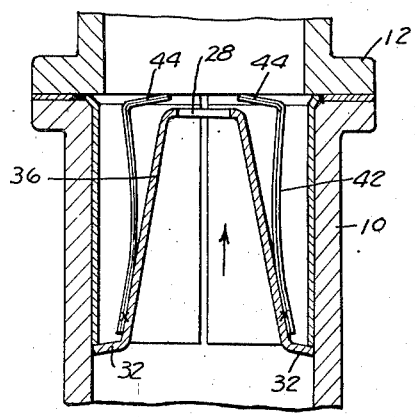
Figure 5:
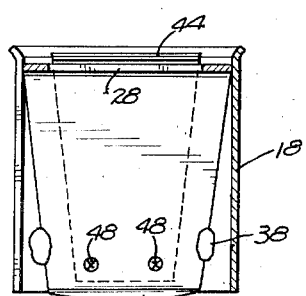
Fig. 5 is a sectional view of the valve taken along the line 5—5 in Fig. 1.

When hot exhaust gases from the exhaust manifold of the engine are directed through conduit 10, these gases cause the bimetal elements 40 to become heated. The laminations of the elements 40 are arranged with the laminations having the higher coefficient of expansion on the inside; that is, on the side disposed adjacent the walls 36 of baffle 24. Thus, when the elements become heated, they flex outwardly such as shown in Figs. 3 and 4. Outwardly flexing of the elements 40 causes the ends 44 to shift in directions away from one another to an extent depending upon the temperature of the members 40. Thus, in Fig. 3, the elements 40 are shown in a condition partly uncovering the orifice 28; and in Fig 4, these elements are shown heated to a higher temperature wherein the orifice 28 is completely uncovered by the ends 44.

Thus, it will be seen that the thermostatic valve disclosed herein is admirably suited for use under conditions where high pressures and high temperatures are prevalent. The bimetal elements are shielded from the high pressure of the exhaust gases on the high side of the valve by baffle 28. The only portions of the elements 40 that are subjected to the high pressure are the ends 44. Thus, the valve is substantially unaffected by the pulsations in pressure due to the alternate firings of the cylinders of the engine. In addition, it will be noted that the bimetal elements 40 are in face to face contact with the walls 36 of the baffle and that the edges of the baffle 24 contact the inner surface of tube 18. Thus, the valve is designed to conduct the heat away from the bimetal elements 40 quite rapidly. This particular feature enables the valve to handle the exhaust gases which are very hot without changing the calibration of the members 40.

I claim:
1. A thermostatic valve assembly comprising a tube, a baffle within said tube, said baffle comprising a plate bent into U shape, said baffle having side walls tapering radially inwardly in a direction generally axially of the tube, said side walls engaging the walls of the tube along their edges and defining a tapered throat in said tube through which the gases in said tube are directed, said throat being provided with an orifice at its smaller end and bimetallic means extending along and positioned adjacent the outer side of said side walls, said bimetallic means having an end portion normally closing said orifice and being responsive to heat to flex to a position wherein said end portion uncovers said orifice.

2. A valve assembly as called for in claim 1 wherein said bimetallic means comprises a pair of bimetallic elements each anchored at one end on opposite side walls of the baffle, said bimetal elements each extending along the outer side of said side walls and being turned radially inwardly at their free ends to overlie said orifice, said free ends normally abutting one another when in position overlying said orifice.

3. A thermostatic valve assembly comprising a tube, a baffle in said tube having a pair of opposite and generally flat side walls, said side walls extending generally axially of said tube and tapering radially inwardly towards one end, an end wall extending across the converging ends of said side walls in a plane generally perpendicular to the axis of said tube, said end wall being provided with an orifice therein, a pair of bimetal elements extending one along the outer side of each of said side walls, said bimetal elements each having a free end turned radially inwardly and normally overlying a portion of said orifice, said free end portions cooperating to normally close said orifice, the portion of each bimetal element extending along said side walls being responsive to heat to flex in a generally radially outward direction and thereby progressively move said free end portions radially outwardly from said position normally closing said orifice.

4. A valve assembly as called for in claim 3 wherein said baffle comprises a U-shaped member having its peripheral edge shaped to interfit with the inner surface of said tube.

5. A valve assembly as called for in claim 4 wherein said bimetal elements are anchored at one end on the diverging end portions of said side walls.

6. A thermostatic valve assembly comprising an axially split tube having axially extending edges at the split which are slightly spaced apart circumferentially so that the tube may be contracted for insertion into a conduit through which fluid flow is to be controlled, a baffle in said tube having axially extending side walls which taper radially inwardly, said baffle having a radially disposed end wall extending across the inwardly tapering ends of said side walls, said end wall having a central opening therein, said baffle closing said tube except for the area defined by said central opening, a pair of bimetallic elements extending axially along the outer sides of the side walls of said baffle and having opposed end portions overlying said end wall of the baffle and normally closing the opening therein, said bimetallic elements being secured to the side walls of said baffle adjacent the enlarged end of the baffle and being responsive to heat to flex radially, whereby said end portions of the thermostatic elements uncover said central opening in the baffle.

7. A valve assembly as called for in claim 6 wherein one end of said tube is provided with a radially outwardly flaring portion.

8. A thermostatic valve assembly comprising a tube adapted to be inserted into a conduit for controlling the flow of fluid through the conduit, a baffle in said tube comprising an elongate plate bent into U shape so as to extend axially within said tube, said plate having a central opening therein and having its peripheral edge contacting the inner face of said tube, whereby the passageway through said tube is defined in part by the side wall of the tube and in part by said baffle, a pair of bimetallic elements positioned in diametrically opposed relation on the outer sides of said plate, said elements having axially extending leg portions terminating in radially inwardly bent portions at their ends, said inwardly bent portions normally overlying said opening to close the passageway through said tube, said leg portions being responsive to heat to flex and thereby shift said inwardly bent portions radially outwardly to uncover said central opening.

9. A valve assembly as called for in claim 8 wherein said plate defines a radially inwardly tapering throat in said tube, said central opening being disposed at the smaller end of said throat.

10. A valve assembly as called for in claim 9 wherein the axially extending sides of said baffle are substantially flat and the legs of said thermostatic elements are normally in coplanar engagement with the outer faces of said axially extending sides of the baffle.

References Cited in the file of this patent
UNITED STATES PATENTS

| Number | Name | Date |
|---|---|---|
| 273,757 | Morel | Mar. 13, 1883 |
| 1,564,504 | Woolson | Dec. 8, 1925 |
| 2,300,418 | Hall | Nov. 3, 1942 |
| 2,509,482 | Crise | May 30, 1950 |
| 2,581,045 | Rhoads | Jan. 1, 1952 |